(12) United States Patent
Yen et al.

(10) Patent No.: US 9,485,114 B2
(45) Date of Patent: Nov. 1, 2016

(54) MAC ABSTRACTION SUB-LAYER AND MAC TABLE FOR A COMMUNICATION SYSTEM AND RELATED COMMUNICATION DEVICE

(75) Inventors: Chia-Wei Yen, Hsinchu County (TW); Jian-Li Mao, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 1266 days.

(21) Appl. No.: 13/342,111

(22) Filed: Jan. 2, 2012

(65) Prior Publication Data
US 2012/0243556 A1 Sep. 27, 2012

Related U.S. Application Data

(60) Provisional application No. 61/467,402, filed on Mar. 25, 2011, provisional application No. 61/487,712, filed on May 19, 2011.

(51) Int. Cl.
*H04L 12/413* (2006.01)
*H04L 29/08* (2006.01)
*H04W 80/02* (2009.01)

(52) U.S. Cl.
CPC ....... *H04L 12/413* (2013.01); *H04L 29/08027* (2013.01); *H04L 29/08018* (2013.01); *H04W 80/02* (2013.01)

(58) Field of Classification Search
CPC ........... H04L 12/413; H04L 29/08009; H04L 29/08018; H04L 29/08027; H04W 80/02
See application file for complete search history.

(56) References Cited

U.S. PATENT DOCUMENTS

| 6,456,597 | B1* | 9/2002 | Bare | 370/252 |
| 6,560,234 | B1* | 5/2003 | Ben-Michael | H04L 12/2801 370/401 |
| 7,151,762 | B1* | 12/2006 | Ho et al. | 370/338 |
| 7,610,399 | B1* | 10/2009 | Lin | H04L 12/00 370/376 |
| 7,917,121 | B2* | 3/2011 | Kim et al. | 455/343.2 |
| 2005/0237956 | A1* | 10/2005 | Kuperschmidt et al. | 370/310 |
| 2005/0238025 | A1* | 10/2005 | Hay | H04L 1/0041 370/395.1 |
| 2006/0034233 | A1* | 2/2006 | Strutt | H04L 45/123 370/338 |
| 2006/0153235 | A1* | 7/2006 | Kiernan et al. | 370/469 |
| 2007/0173283 | A1 | 7/2007 | Livet | |
| 2008/0170531 | A1* | 7/2008 | Petry | H04L 65/601 370/312 |
| 2009/0047963 | A1 | 2/2009 | Kim | |
| 2009/0092154 | A1* | 4/2009 | Malik et al. | 370/480 |
| 2009/0124208 | A1* | 5/2009 | Mody et al. | 455/67.11 |

(Continued)

FOREIGN PATENT DOCUMENTS

| TW | 200814553 | 3/2008 |
| TW | 201110646 | 3/2011 |

*Primary Examiner* — Parth Patel
*Assistant Examiner* — Kai Chang
(74) *Attorney, Agent, or Firm* — Winston Hsu; Scott Margo (57) ABSTRACT

A method of converging a plurality of communication standards is disclosed. The method comprises providing a medium access control (MAC) abstraction sub-layer, wherein the MAC abstraction sub-layer is arranged between an upper layer and a plurality of MAC layers of the plurality of communication standards; and providing a corresponding service management entity (SME) between the MAC abstraction sub-layer and the plurality of MAC layers and a plurality of physical (PHY) layers of the plurality of communication standards in a control plane; wherein the MAC abstraction sub-layer communicates with the plurality of MAC layers and the plurality of PHY layers in the control plane via the corresponding SME, and the corresponding SME communicates with the MAC abstraction sub-layer via an application programming interface (API).

13 Claims, 8 Drawing Sheets

(56) References Cited

U.S. PATENT DOCUMENTS

| | | | |
|---|---|---|---|
| 2009/0262753 A1* | 10/2009 | On et al. | 370/466 |
| 2010/0087216 A1* | 4/2010 | Ko | H04B 7/1555 |
| | | | 455/500 |
| 2011/0034201 A1* | 2/2011 | Hamada et al. | 455/517 |
| 2011/0103309 A1* | 5/2011 | Wang et al. | 370/328 |
| 2011/0149897 A1* | 6/2011 | Youn | H04W 72/0413 |
| | | | 370/329 |
| 2011/0150056 A1* | 6/2011 | Park | 375/220 |
| 2012/0239794 A1* | 9/2012 | Klein | 709/223 |
| 2013/0308543 A1* | 11/2013 | Cordeiro | H04W 12/04 |
| | | | 370/328 |

* cited by examiner

FIG. 8

MAC ABSTRACTION SUB-LAYER AND MAC TABLE FOR A COMMUNICATION SYSTEM AND RELATED COMMUNICATION DEVICE

CROSS REFERENCE TO RELATED APPLICATIONS

This application claims both the benefit of U.S. Provisional Application No. 61/467,402, filed on Mar. 25, 2011, entitled "MAC Abstraction Sub-layer Definition", and the benefit of U.S. Provisional Application No. 61/487,712, filed on May 19, 2011, entitled "MAC Table Based on MAC Abstraction Sub-layer", the contents of which are incorporated herein in their entirety.

BACKGROUND OF THE INVENTION

1. Field of the Invention

The present invention relates to a method used for a communication system and related communication device, and more particularly, to a method of defining a medium access control (MAC) abstraction sub-layer and a MAC table for a communication system and related communication device.

2. Description of the Prior Art

With rapidly growing of user's needs for accessing digital contents everywhere, various communication standards have been developed for transmission of the digital contents. These communication standards may be developed for different environments, different transmission speeds and/or different user requirements. Further, organizations and industries are now devoting to develop improved versions of the existing communication standards as well as completely new communication standards for satisfying the user's needs.

However, even though these communication standards have been developed to satisfy the user's needs, it may be difficult for a user to use a communication device conforming to these communication standards due to various system parameter settings for these communication standards. Further, if each of these communication standards is realized by a specific module of the communication device, power consumption is high due to using separate modules for realizing these communication standards. Besides, manufacturing such the communication device is inefficient in both cost and size, since part of functions of these communication standards are the same and should be converged.

Therefore, a method for efficiently converging these various communication standards is needed.

SUMMARY OF THE INVENTION

The present invention therefore provides a method and related communication device for a medium access control (MAC) abstraction sub-layer and a MAC table to solve the abovementioned problems.

A method of converging a plurality of communication standards is disclosed. The method comprises providing a medium access control (MAC) abstraction sub-layer, wherein the MAC abstraction sub-layer is arranged between an upper layer and a plurality of MAC layers of the plurality of communication standards; and providing a corresponding service management entity (SME) between the MAC abstraction sub-layer and the plurality of MAC layers and a plurality of physical (PHY) layers of the plurality of communication standards in a control plane; wherein the MAC abstraction sub-layer communicates with the plurality of MAC layers and the plurality of PHY layers in the control plane via the corresponding SME, and the corresponding SME communicates with the MAC abstraction sub-layer via an application programming interface (API).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
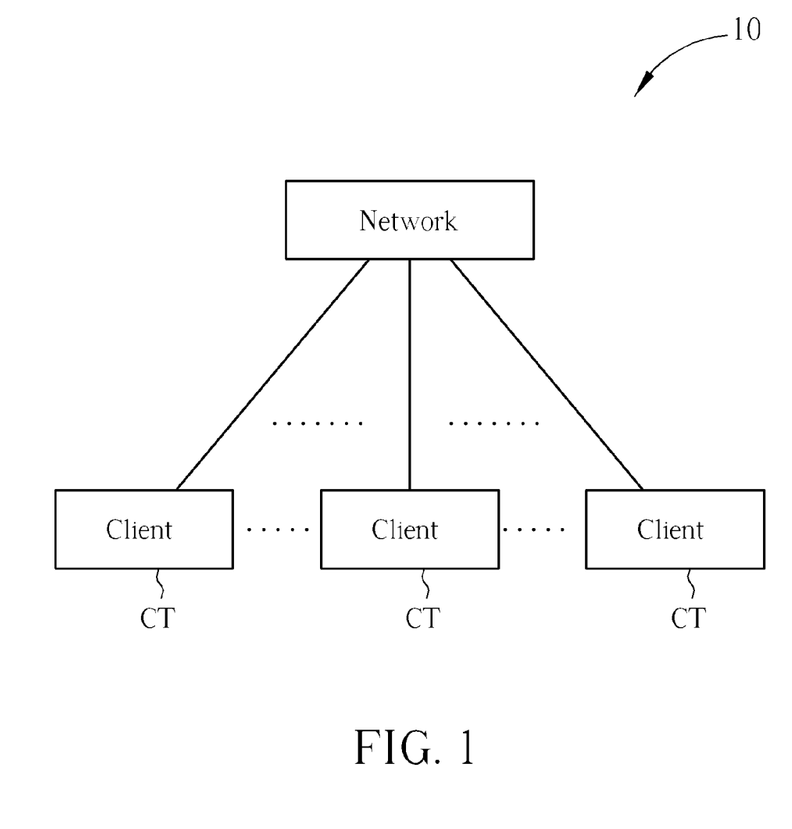
FIG. 1 is a schematic diagram of an exemplary communication system according to the present invention.

Please refer to FIG. 1, which is a schematic diagram of a communication system 10 according to an example of the present invention. The communication system 10 is briefly composed of a network and a plurality of clients CT. In FIG. 1, the network and the clients CT are simply utilized for illustrating the structure of the communication system 10. Practically, the network can be referred as to any network equipment such as a server, a gateway, a router or a bridge. The clients CT can be mobile phones, laptops, tablet computers, electronic books, modems, and portable computer systems. Further, a client CT may communicate with the network or another client CT according to a communication standard such as the IEEE 802.3 standard (i.e. Ethernet), the IEEE 802.11 standard (i.e. WiFi), the IEEE 1901 standard (i.e. power line communication (PLC)) or the Multimedia over Coax Alliance (MoCA) standard, and is not limited herein.

Figure 2:
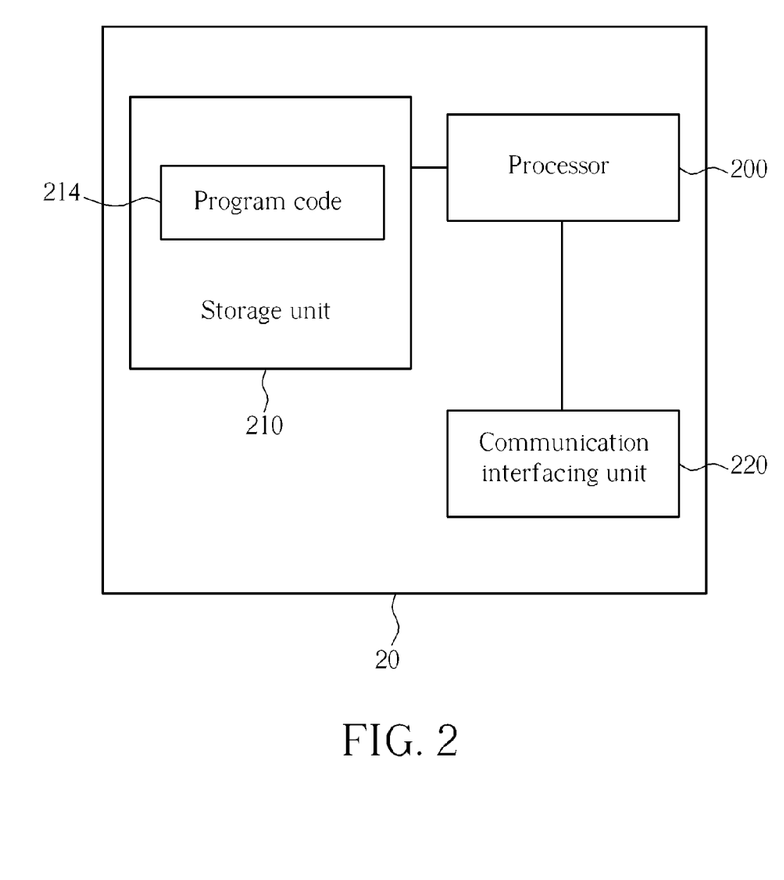
FIG. 2 is a schematic diagram of an exemplary communication device according to the present invention.

Please refer to FIG. 2, which is a schematic diagram of a communication device 20 according to an example of the present invention. The communication device 20 can be a client CT or the network shown in FIG. 1, but is not limited herein. The communication device 20 may include a processor 200 such as a microprocessor or an Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with a client CT or the network according to processing results of the processor 200.

Figure 3:
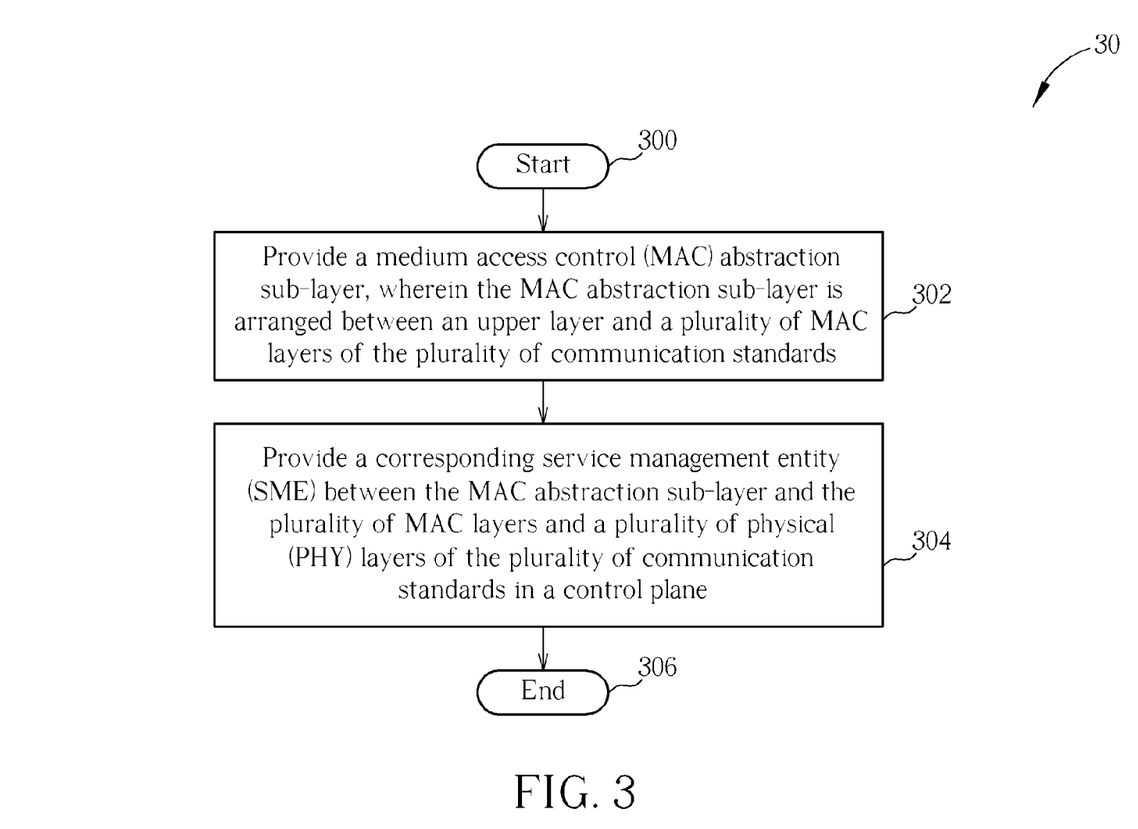
FIG. 3 is a flowchart of an exemplary process according to the present invention.

Please refer to FIG. 3, which is a flowchart of a process 30 according to an example of the present invention. The process 30 is utilized in a client CT or the network shown in FIG. 1, for converging a plurality of communication standards. The process 30 may be compiled into the program code 214 and includes the following steps:

Step 300: Start.

Step 302: Provide a medium access control (MAC) abstraction sub-layer, wherein the MAC abstraction sub-layer is arranged between an upper layer and a plurality of MAC layers of the plurality of communication standards.

Step 304: Provide a corresponding service management entity (SME) between the MAC abstraction sub-layer and the plurality of MAC layers and a plurality of physical (PHY) layers of the plurality of communication standards in a control plane.

Step 306: End.

According to the process 30, the MAC abstraction sub-layer is provided and is arranged between the upper layer and the plurality of MAC layers of the plurality of communication standards. Then, the corresponding SME is arranged between the MAC abstraction sub-layer and the plurality of MAC layers and the plurality of PHY layers of the plurality of communication standards in the control plane. Further, the MAC abstraction sub-layer communicates with the plurality of MAC layers and the plurality of PHY layers in the control plane via the corresponding SME, and the corresponding SME communicates with the MAC abstraction sub-layer via an application programming interface (API). In other words, the MAC abstraction sub-layer and the plurality of MAC layers are combined as a new MAC layer for the plurality of PHY layers of the plurality of communication standards. Besides, SMEs and APIs are provided as bridges and interfaces between the MAC abstraction sub-layer and the plurality of communication standards in the control plane. Therefore, not only redundant codes and redundant circuits can be avoided, but the client CT and the network can be set up more easily due to the arrangement of the MAC abstraction sub-layer. In comparison, an independent module is needed in the prior art, for comprising an upper layer, a MAC layer and a PHY layer of a communication standard, to process signalings and packets conforming to the communication standard. When modules of multiple communication standards are installed in the client CT and the network according to the prior art, not only the redundant codes and the redundant circuits are required but it is inconvenient to setup the client CT and the network due to various parameters corresponding to the multiple communication standards.

Figure 4:
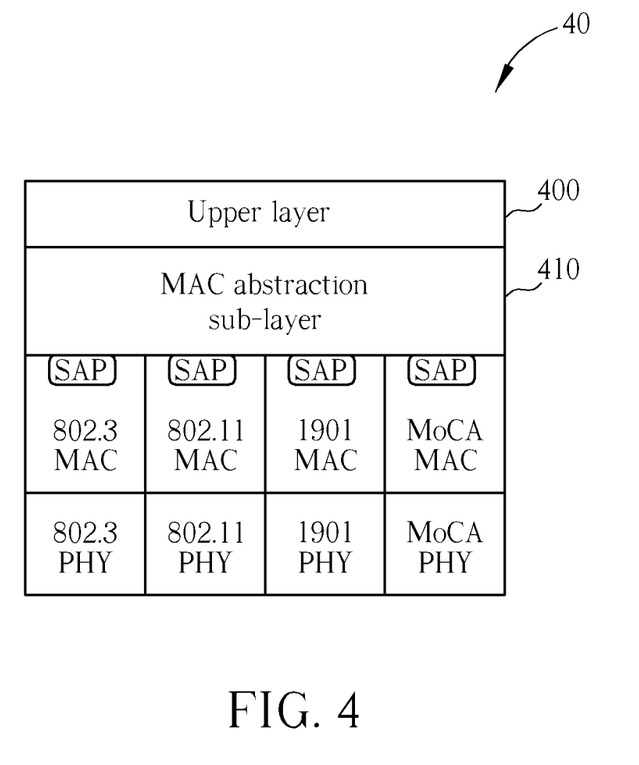
FIG. 4 is a schematic diagram of a protocol stack according to an embodiment of the present invention.

Please note that, detail of the MAC abstraction sub-layer can be defined according to the communication device 20 in which the MAC abstraction sub-layer is installed and the plurality of MAC layers it is connected with, and is not limited, as long as signalings and packets between the upper layer and the plurality of MAC layers can be properly processed. For example, please refer to FIG. 4, which is a schematic diagram of a protocol stack 40 according to an example of the present invention. FIG. 4 is used for illustrating a data plane of the protocol stack 40. The protocol stack 40 includes an upper layer 400, a MAC abstraction sub-layer 410, a plurality of MAC layers and a plurality of PHY layers. The plurality of MAC layers include an 802.3 MAC, an 802.11 MAC, a 1901 MAC and a MoCA MAC conforming to the IEEE 802.3 standard, the IEEE 802.11 standard, the IEEE 1901 standard and the MoCA standard, respectively. Further, each of the plurality of MAC layers includes a service access point (SAP) in the data plane, such that the MAC abstraction sub-layer 410 can communicate with the plurality of MAC layers via the SAPs of the plurality of MAC layers, respectively. For example, when there is a packet arriving at the 802.11 MAC, the MAC abstraction sub-layer 410 receives the packet via the SAP of the 802.11 MAC. Alternatively, when there is a packet arriving at the MAC abstraction sub-layer 410 and is needed to be transmitted via the 1901 MAC, the MAC abstraction sub-layer 410 transmits the packet via the SAP of the 1901 MAC to the 1901 MAC. On the other hand, the plurality of PHY layers include an 802.3 PHY, an 802.11 PHY, a 1901 PHY and a MoCA PHY conforming to the IEEE 802.3 standard, the IEEE 802.11 standard, the IEEE 1901 standard and the MoCA standard, respectively. The upper layer 400 can be a network layer, a transport layer, an application layer or any layer responsible for processing the signalings and the packets received from the MAC abstraction sub-layer 410, and the signalings and the packets to be transmitted via the MAC abstraction sub-layer 410. In short, detail realization of the protocol stack 40 depends on a type of the communication device 20 in which the protocol stack 40 is installed and the communication standards to which the protocol stack 40 is needed to conform, and those skilled in the art should readily make modifications or alterations accordingly.

Figure 5:
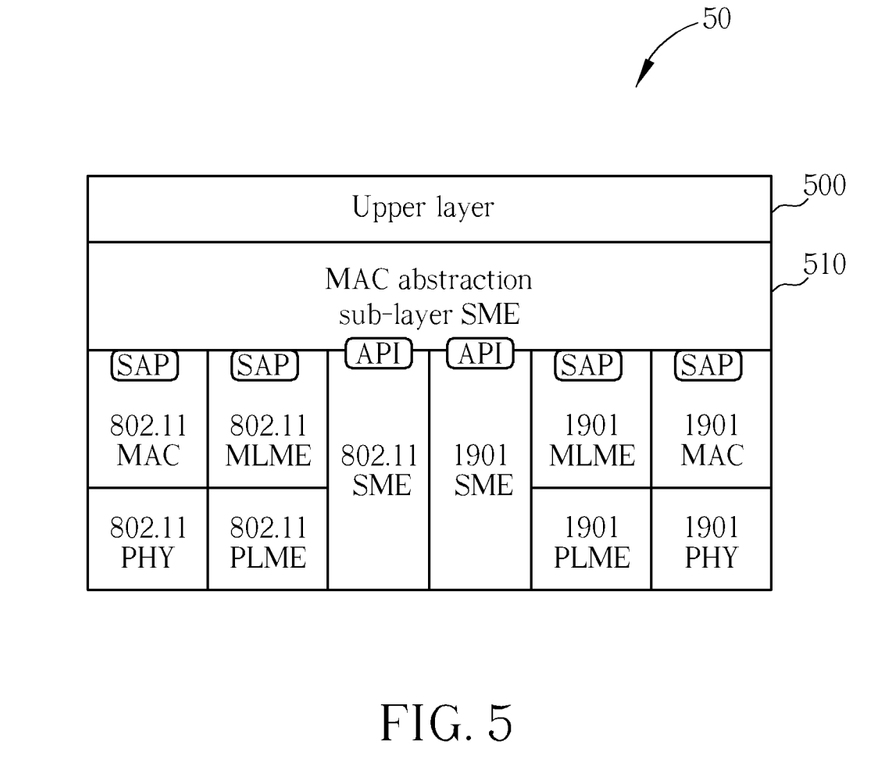
FIG. 5 is a schematic diagram of a protocol stack according to an embodiment of the present invention.

Please refer to FIG. 5, which is a schematic diagram of a protocol stack 50 according to an example of the present invention. FIG. 5 is derived from FIG. 4, and is used for illustrating a control plane of the protocol stack 40. Besides, only protocol layers corresponding to the IEEE 802.11 and the IEEE 1901 are shown in FIG. 5 for illustration. In practice, standards to be converged are not limited to the standards illustrated above. Similar to the protocol stack 40, the protocol stack 50 includes an upper layer 500, a MAC abstraction sub-layer 510, two MAC layers (e.g. an 802.11 MAC and a 1901 MAC) and two PHY layers (e.g. an 802.11 PHY and a 1901 PHY). Functions of these protocol layers can be referred to the above, and are not narrated for simplicity. Further, the protocol stack 50 includes an 802.11 SME and a 1901 SME, for processing control signalings corresponding to the IEEE 802.11 and the IEEE 1901, respectively. The 802.11 SME is arranged between the MAC abstraction sub-layer 510 and the 802.11 MAC and the 802.11 PHY, and the 1901 SME is arranged between the MAC abstraction sub-layer 510 and the 1901 MAC and the 1901 PHY. Therefore, the MAC abstraction sub-layer 510 can communicate (e.g. control or respond) with the 802.11 MAC and the 802.11 PHY via the 802.11 SME. Similarly, the MAC abstraction sub-layer 510 can communicate (e.g. control or respond) with the 1901 MAC and the 1901 PHY via the 1901 SME.

Preferably, an 802.11 MAC sub-layer management entity (MLME) is arranged between the 802.11 SME and the 802.11 MAC (e.g. as an interface or a tunnel), such that the 802.11 SME and the 802.11 MAC can communicate with each other via the 802.11 MLME. Similarly, an 802.11 physical sub-layer management entity (PLME) is arranged between the 802.11 SME and the 802.11 PHY (e.g. as an interface or a tunnel), such that the 802.11 SME and the 802.11 PHY can communicate with each other via the 802.11 PLME. A 1901 MLME and a 1901 PLME are similarly arranged for the 1901 MAC and the 1901 PHY, and details can be referred to the above description. Besides, the MAC abstraction sub-layer 510 preferably communicates with the 802.11 SME via an application programming interface (API), and the MAC abstraction sub-layer 510 preferably communicates with the 1901 SME via the API.

Figure 6:
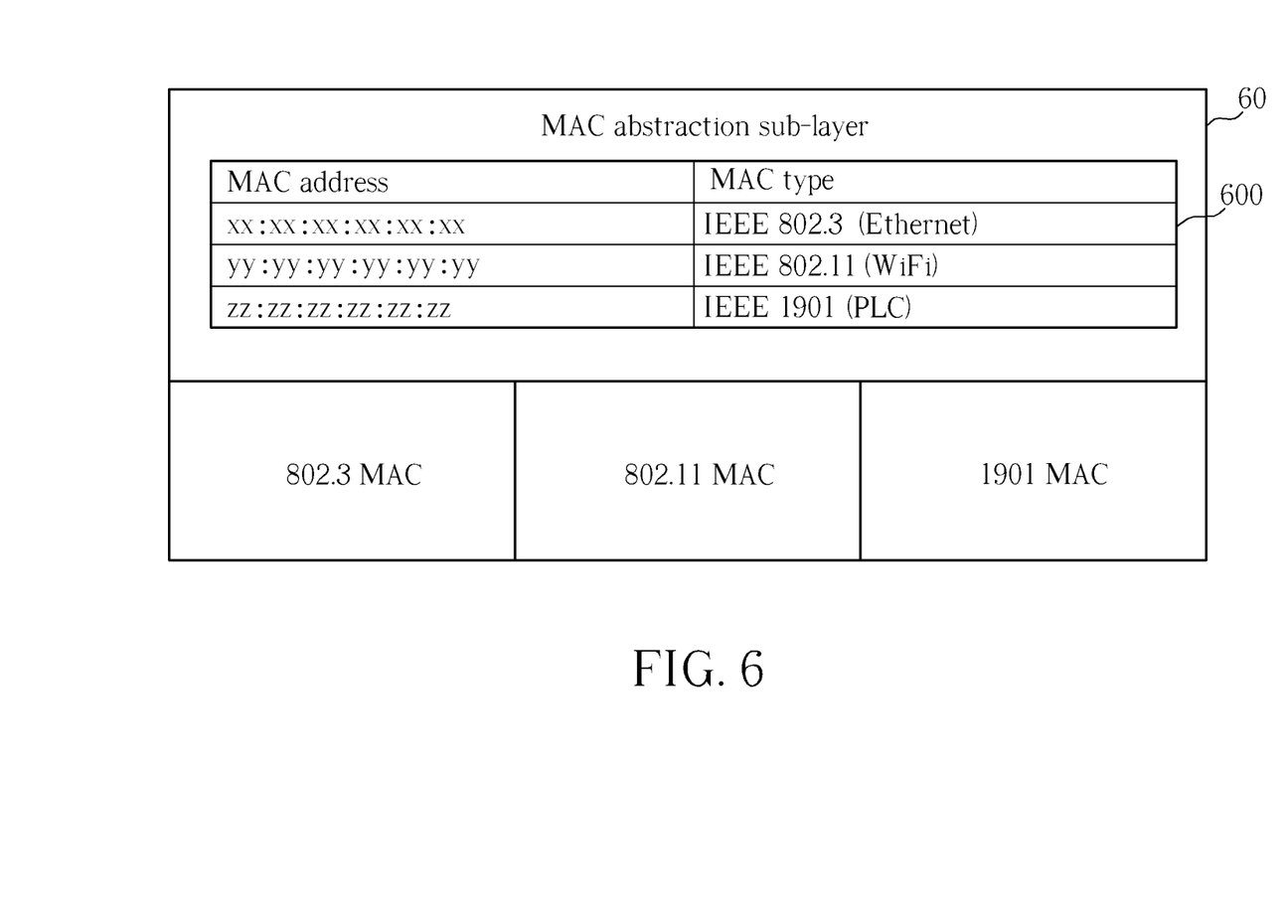
FIG. 6 is a schematic diagram of a MAC abstraction sub-layer according to an embodiment of the present invention.

As mentioned above, detail of the MAC abstraction sub-layer is not limited, as long as the signalings and the packets between the upper layer and the plurality of MAC layers can be properly processed. For example, please refer to FIG. 6, which is a schematic diagram of a MAC abstraction sub-layer 60 according to an example of the present invention. The MAC abstraction sub-layer 60 can be used for realizing the MAC abstraction sub-layer 40 and the MAC abstraction sub-layer 50, and includes a MAC table 600 and three MAC layers (e.g. an 802.3 MAC, an 802.11 MAC and a 1901 MAC). The MAC table includes a MAC address field and a MAC type field, for storing a MAC address and a MAC type of a packet, respectively. A relation between the MAC address and the MAC type is established. That is, when the MAC abstraction sub-layer 60 needs to transmit a packet via a MAC layer of a communication standard, the MAC abstraction sub-layer 60 checks a destination address of the packet, and determines a MAC type of the destination address by looking up the MAC table 600. Then, the MAC abstraction sub-layer 60 can transmit the packet via the MAC layer corresponding to the determined MAC type. In other words, the MAC table 600 indicates the MAC layer via which the packet should be transmitted, to the MAC abstraction sub-layer, i.e., the MAC table 600 indicates a communication standard to which the packet conforms, to the MAC abstraction sub-layer. For example, the MAC abstraction sub-layer 60 prepares to transmit a packet with a destination address of yy:yy:yy:yy:yy:yy. After checking the MAC table 600, the MAC abstraction sub-layer 60 can determine that the destination address of yy:yy:yy:yy:yy:yy corresponds to the IEEE 802.11 (i.e., WiFi). Then, the MAC abstraction sub-layer 60 transmits the packet via the 802.11 MAC without flooding the packet via all the MAC layers. Therefore, the MAC abstraction sub-layer 60 does not need to flood the packet via multiple MAC layers. Not only network resources can be saved, but network congestion due to the flooding can be avoided.

Figure 7:
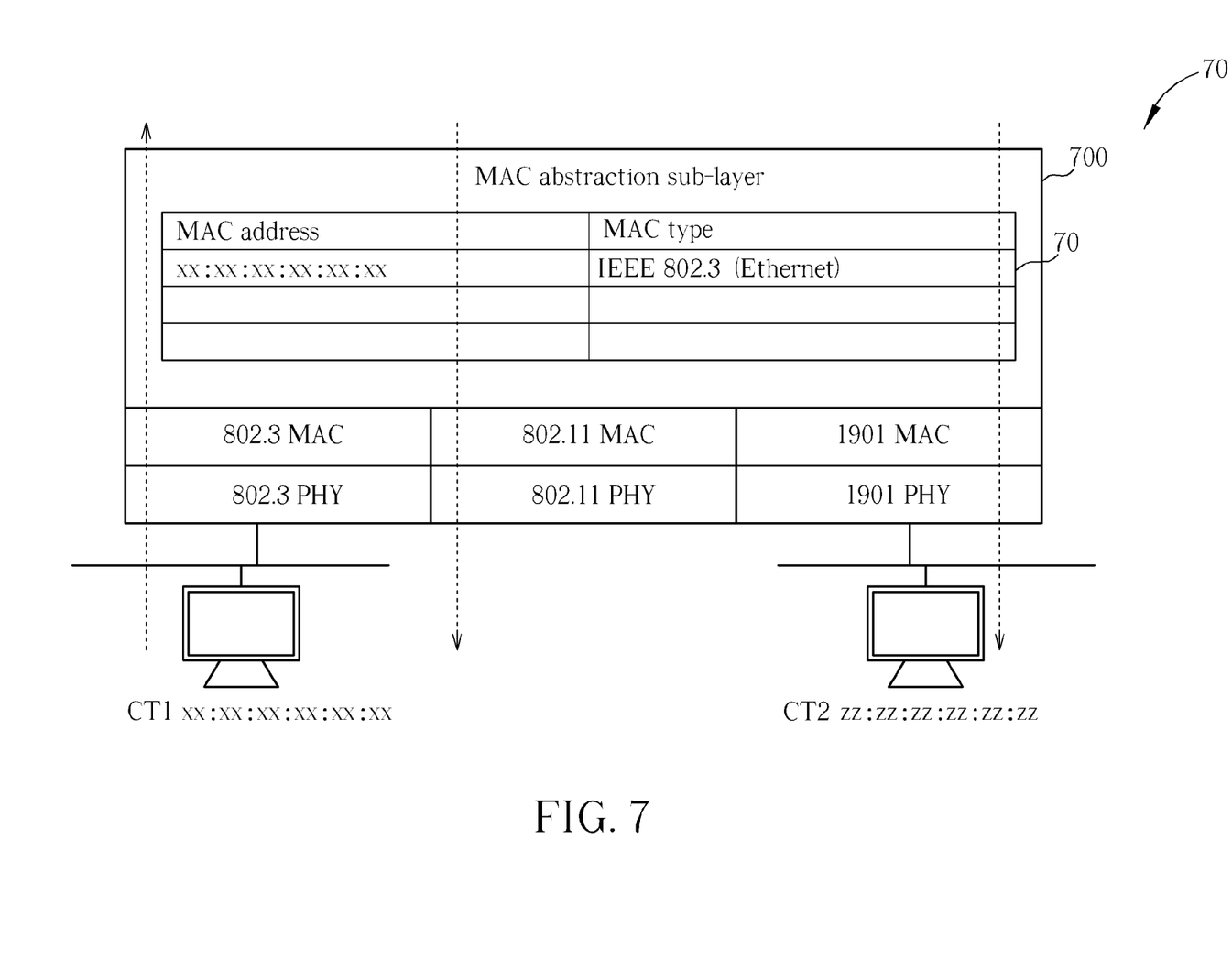
FIG. 7 is a schematic diagram of an exemplary communication system according to the present invention.

Please note that, a MAC table is used for indicating a MAC layer or a communication standard for transmitting a packet, and a method based on which the MAC table is realized or established is not limited. For example, please refer to FIG. 7, which is a communication system 70 according to an example of the present invention. The communication system 70 is briefly composed of a MAC abstraction sub-layer 700, a client CT1 and a client CT2. In detail, functions and features of the MAC abstraction sub-layer 700 and the MAC abstraction sub-layer 60 are the same except that a MAC table 710 of the MAC abstraction sub-layer 700 is empty and is needed to be established. Further, the MAC abstraction sub-layer 700 may be installed in any network equipment such as a server, a gateway, a router or a bridge, and is not limited herein. Besides, the client CT1 communicates with other entities via the IEEE 802.3, and has an MAC address of xx:xx:xx:xx:xx:xx; the client CT2 communicates with other entities via the IEEE 1901, and has an MAC address of zz:zz:zz:zz:zz:zz. When the MAC abstraction sub-layer 700 receives a packet with a source address of xx:xx:xx:xx:xx:xx and a destination address of zz:zz:zz:zz:zz:zz transmitted by the client CT1 via the 802.3 MAC, the MAC abstraction sub-layer 700 checks if the source address and its MAC type (e.g. the IEEE 802.3) are stored and related in the MAC table 710. If no, the MAC abstraction sub-layer 700 stores and relates xx:xx:xx:xx:xx:xx and the IEEE 802.3 in the MAC table 710, as shown in the first row of FIG. 7. Before transmitting the packet, the MAC abstraction sub-layer 700 checks if the destination address and its MAC type (e.g. the IEEE 1901) are stored and related in the MAC table 710. If yes, the MAC abstraction sub-layer 700 transmits the packet via the 1901 MAC, and network resource is used efficiently. If no, the MAC abstraction sub-layer 700 floods the packet via the MAC layers. Please note that, the MAC abstraction sub-layer 700 floods the packet via all the MAC layers except the 802.3 MAC corresponding to the source address in FIG. 7. However, the MAC abstraction sub-layer 700 may also flood the packet via all the MAC layers, and is not limited herein.

Figure 8:
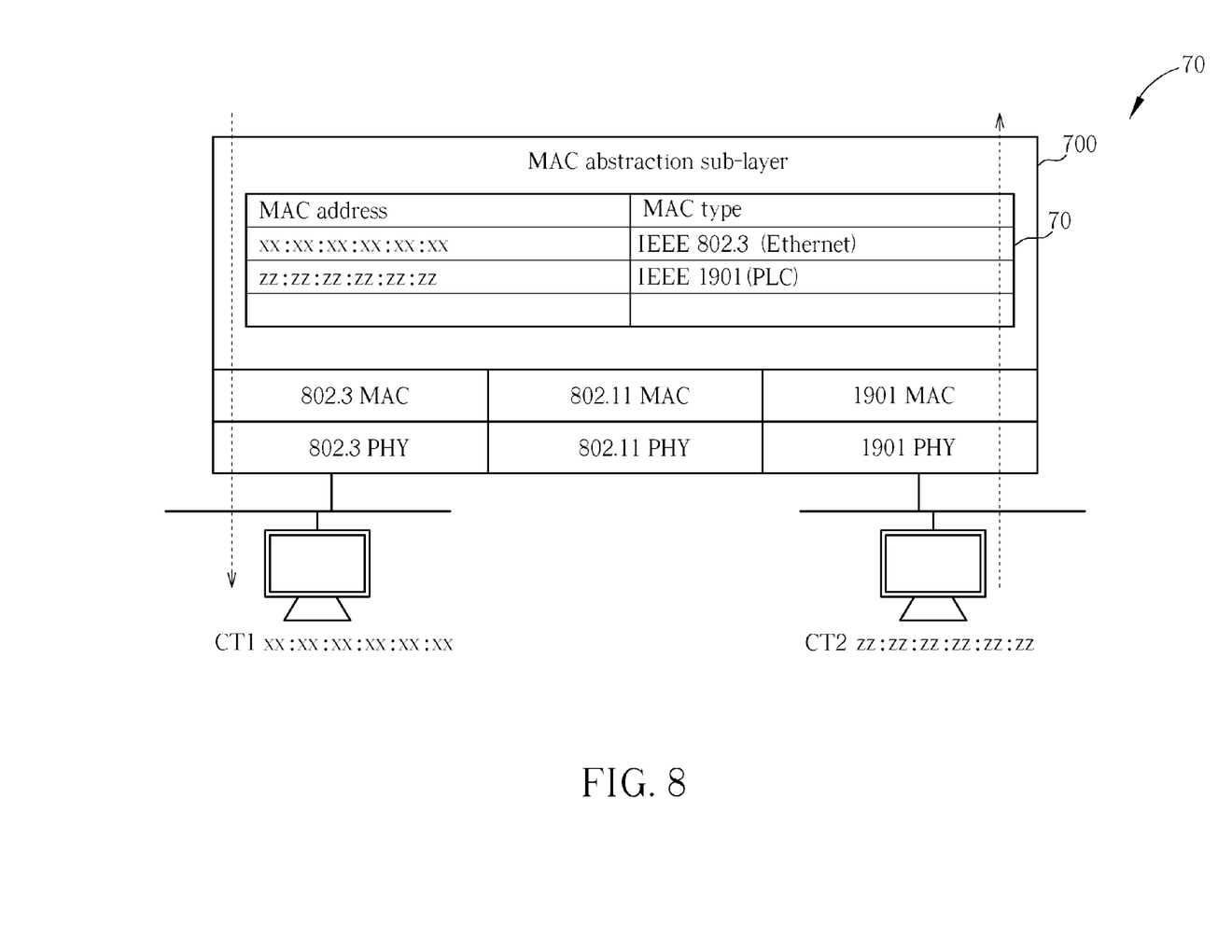
FIG. 8 is a schematic diagram of a communication system according to operations of the communication system of FIG. 7.

As shown in FIG. 8, which illustrates operation of the communication system 70 after the client CT2 receives the packet, the client CT2 replies an acknowledgement packet with a source address of zz:zz:zz:zz:zz:zz and a destination address of xx:xx:xx:xx:xx:xx to the client CT1 via the MAC abstraction sub-layer 700. When the MAC abstraction sub-layer 700 receives the acknowledgement packet, the MAC abstraction sub-layer 700 checks if the source address of the acknowledgement packet and its MAC type (e.g. the IEEE 1901) are stored and related in the MAC table 710. If no, the MAC abstraction sub-layer 700 stores and relates zz:zz:zz:zz:zz:zz and the IEEE 1901 in the MAC table 710, as shown in the second row of the MAC table 710 of FIG. 8. Before transmitting the packet, the MAC abstraction sub-layer 700 checks if the destination address and its MAC type (e.g. the IEEE 802.3) are stored and related in the MAC table 710. Since the destination address and its MAC type are stored in the first row of the MAC table 710, the MAC abstraction sub-layer 700 can transmit the acknowledgement packet without the flooding. Since the MAC addresses and the MAC types of the clients CT1 and CT2 are stored in the MAC table 710 after initial transmissions, the MAC abstraction sub-layer 700 can transmit packets (even transmitted by other clients) targeting to these MAC addresses without the flooding in later transmissions. Therefore, not only network resources can be saved, but network congestion due to the flooding can be avoided.

Please note that, the MAC table mentioned above is only an example for realizing the MAC abstraction sub-layer according to the present invention, and is not a necessary feature of the MAC abstraction sub-layer. Besides, the abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method and related communication device for a MAC abstraction sub-layer and a MAC table, to efficiently converge multiple communication standards. Therefore, when modules of the multiple communication standards are installed in clients and a network, not only codes and circuits for realizing the multiple communication standards can be simplified, but it is convenient to setup the clients and the network due to MAC abstraction sub-layer. Besides, network resources can be saved and network congestion due to the flooding can be avoided by using the MAC table.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of converging a plurality of communication standards, the method comprising:
providing a medium access control (MAC) abstraction sub-layer, wherein the MAC abstraction sub-layer is arranged between an upper layer and a plurality of MAC layers of the plurality of communication standards, and the plurality of MAC layers of the plurality of communication standards communicate with the upper layer through the same MAC abstraction sub-layer; and
providing a plurality of service management entities (SMEs), each between the MAC abstraction sub-layer and one of the plurality of MAC layers and one of a plurality of physical (PHY) layers of the plurality of communication standards in a control plane;
wherein each of the plurality of SMEs one by one corresponds to one of the plurality of MAC layers and one of the plurality of PHY layers;
wherein the MAC abstraction sub-layer communicates with the plurality of MAC layers and the plurality of PHY layers in the control plane via the corresponding SMEs, and the corresponding SMEs communicate with the MAC abstraction sub-layer via an application programming interface (API).

2. The method of claim 1, wherein the MAC abstraction sub-layer and the plurality of MAC layers are combined as a new MAC layer for the plurality of communication standards.

3. The method of claim 1, wherein the MAC abstraction sub-layer is used for processing signalings and packets between the upper layer and the plurality of MAC layers.

4. The method of claim 1, wherein the MAC abstraction sub-layer communicates with the plurality of MAC layers via a plurality of service access points (SAPs) of the plurality of MAC layers in a data plane, respectively.

5. The method of claim 1, wherein the plurality of SMEs respectively communicate with the plurality of MAC layers via corresponding MAC layer management entities (MLMEs), and the plurality of SMEs respectively communicate with the plurality of PHY layers via corresponding physical layer management entities (PLMEs).

6. The method of claim 1, wherein the MAC abstraction sub-layer comprises:
a MAC table, comprising a MAC address field and a MAC type field for storing a MAC address and a MAC type of a packet, respectively, to relate the MAC address with the MAC type.

7. The method of claim 6, wherein the MAC type indicates a MAC layer or a communication standard for the packet to the MAC abstraction sub-layer.

8. The method of claim 6, wherein the MAC address is a source MAC address or a destination MAC address.

9. The method of claim 6, further comprising:
receiving the packet with a source MAC address with a first MAC type from a first MAC layer of the plurality of MAC layers; and
storing the source MAC address and the first MAC type in the MAC table, for relating the source MAC address and the first MAC type, if the source MAC address and the first MAC type are not stored and related in the MAC table.

10. The method of claim 9, further comprising:
flooding the packet via a set of the plurality of MAC layers, if a destination MAC address of the packet and a second MAC type of the destination MAC address are not stored and related in the MAC table.

11. The method of claim 10, wherein the set of the plurality of MAC layers is the plurality of MAC layers, or the plurality of MAC layers except the first MAC layer of the plurality of MAC layers.

12. The method of claim 9, further comprising:
transmitting the packet via a second MAC layer of the plurality of MAC layers, if a destination MAC address of the packet and a second MAC type indicating the second MAC layer of the plurality of MAC layers are related in the MAC table.

13. The method of claim 1, wherein the plurality of communication standards comprise at least one of the IEEE 802.3 standard, the IEEE 802.11 standard, the IEEE 1901 standard and the Multimedia over Coax Alliance (MoCA) standard.

* * * * *